March 30, 1937.   E. L. WIEGAND   2,075,686
HEATING
Filed Sept. 7, 1935
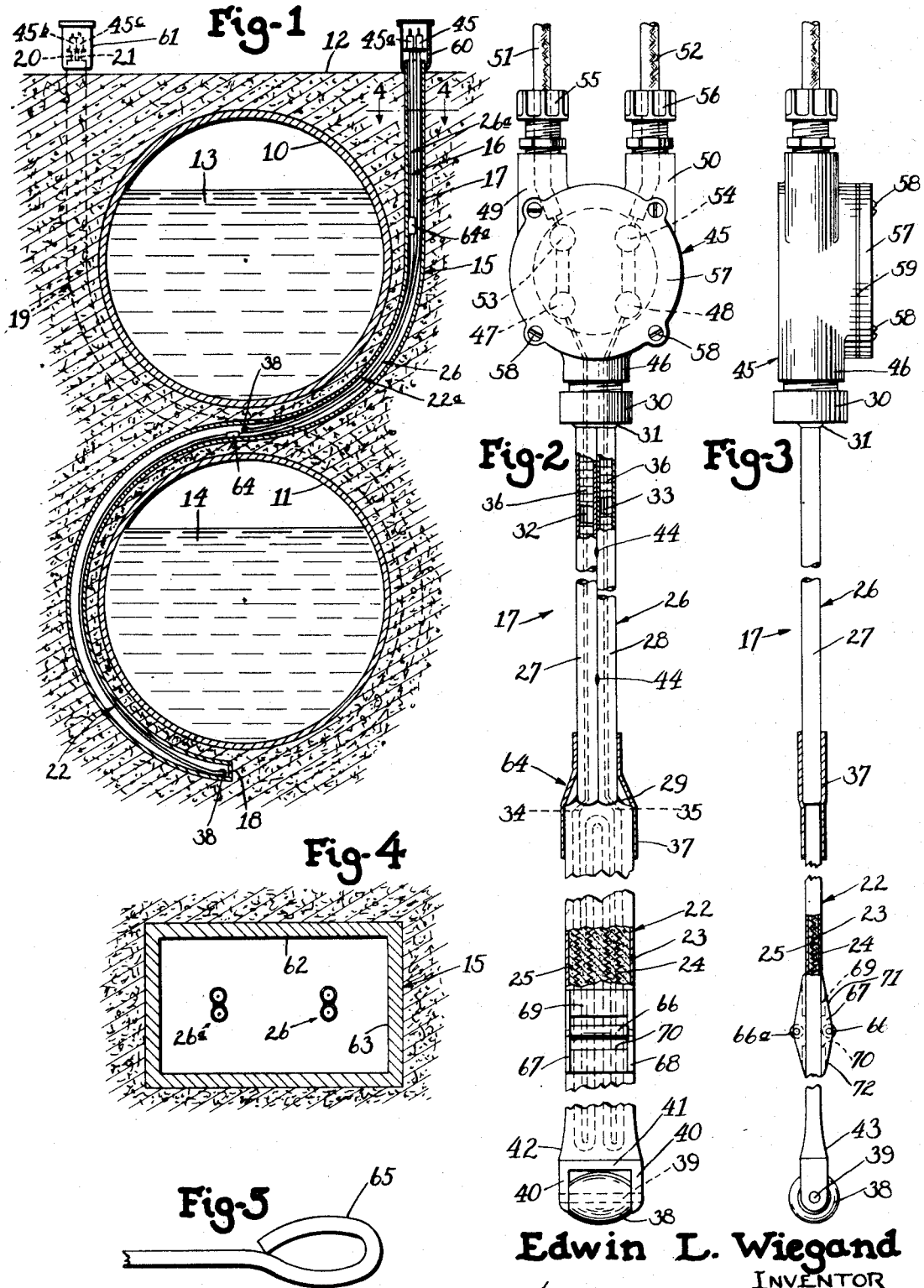
Edwin L. Wiegand
INVENTOR
ATTORNEYS Patented Mar. 30, 1937

2,075,686

UNITED STATES PATENT OFFICE 2,075,686

HEATING

Edwin L. Wiegand, Pittsburgh, Pa.

Application September 7, 1935, Serial No. 39,577

21 Claims. (Cl. 219—46)

My invention relates to heating, and more particularly to electrical heating units, and especially to heating units of a type combinable with structures of such location or configuration, or both, as renders the application of heat difficult, and the principal object of my invention is to provide new and improved heating and heating units of these types. In the drawing accompanying this specification, and forming a part of this application, I have shown, for purposes of illustration, one form of heated structure and several forms of heating units which my invention may assume. In the drawing:

Figure 1 is a vertical sectional view of a heated structure in which my invention is embodied, Figure 2 is a front elevational view of an electrical heating unit embodying my invention, assembled with a junction box, Figure 3 is a side elevation of the heating unit and junction box shown in Figure 2, Figure 4 is a fragmentary horizontal section taken on the line 4—4 of Figure 1, looking in the direction of the arrows, and Figure 5 is a fragmentary side elevation of the end of another embodiment of the heating unit.

Referring to the drawing in detail, there is shown in Figure 1 a heating structure including, in this instance, a pair of tanks 10, 11 which are indicated as underneath the ground level 12, one above the other. The tanks 10, 11 contain bodies of liquid 13, 14, the congealing or solidifying of which is desired to be prevented, or which are desired to be heated above the temperature which they would naturally assume in their situation. To this end a conduit 15 is provided, containing, in this instance, two heating units 16, 17, the conduit 15 extending from the ground level 12 downwards and curving around the right hand side of the upper tank, 10, adjacent the tank, to the lowermost portion thereof, and then reversing in curvature and curving around the left side of the lower tank, 11, as viewed in Figure 1, and extending to and terminating at the lowermost portion of the lower tank, 11. The conduit 15 is thus, in this instance, generally S-shaped. The conduit 15 is here indicated as a metallic conduit and is of generally rectangular cross-section, as may be seen in Figure 4, wider in the general plane of the sinuosity of the conduit than in a plane transverse to that general plane.

One of the heating units, the unit 16, extends from the ground level 12 to a point in the conduit 15 below the lowermost portion of the upper tank. The other heating unit, 17, extends from the ground level 12 down through the entire length of the conduit 15 to an end wall 18 forming the lower terminal end of the conduit.

In Figure 1 there is shown another conduit 19 which is spaced axially, with respect to the tanks 10, 11, from the conduit 15, and is here shown as identical with the conduit 15 except that it is of reverse curvature, as viewed in Figure 1, and has its upper end at the left hand side of the upper tank, 10. This conduit, 19, may also have disposed therein, heating units 20, 21, the same as the heating units 16, 17 disposed in the conduit 15. It will of course be apparent that additional conduits containing heating units may be provided if necessary or desirable. Also, the conduits 15, 19 may lie directly against the tanks 10, 11 instead of being spaced therefrom.

Except for their length, the heating units 16, 17, 20, 21 may be identically formed and a description of one of them will therefore serve for all.

Referring now to Figures 2 and 3 the heating unit, 17, here shown, comprises an elongated heater section 22 of generally rectangular cross-section, in this instance of considerably greater width than thickness, so that it constitutes a flat strip. The heater section 22 has an outer metallic sheath 23, desirably of non-corrodible material, within which is disposed a resistor 24 preferably embedded in highly refractory compacted heat conducting insulating material 25. The resistor 24 is here indicated as a wire helix laid lengthwise back and forth within the sheath 23, but it will be apparent to those skilled in the art that the resistor may be of any other suitable form as desired or as affected by the heating or other requirements.

The heating unit 17 further comprises a lead conductor section 26, shown in this instance as including two conduits 27, 28, which may be made of copper tubing or any other suitable noncorrodible material. The two conduits 27, 28 communicate at their lower ends with the sheath 23 of the heater section 22 and are brazed or otherwise suitably sealed and connected to the sheath 23, as at 29. The other ends of the conduits 27, 28 communicate with the inside of an externally screw-threaded nipple 30 and are likewise brazed and sealed to the nipple 30, as at 31. Forming part of the lead conductor section 26 and disposed within the conduits 27, 28 are lead conductors 32, 33. The lead conductors 32, 33 are desirably of copper or Monel metal or at any rate of low resistance compared to the resistor 24. The lower ends of the lead conductors 32, 33 are connected to terminals 34, 35 of the resistor 24. The lead conductors 32, 33 are desirably insulated from the inside walls of the conduits 27, 28 by refractory so-called fish spine or flower pot beads 36, for a reason which will appear hereinafter.

If desired, the junction between the heater section 22 and the lead conductor section 26 may be strengthened. One way in which this may be done is by a metal ferrule 37, desirably of resilient metal, brazed or otherwise suitably fastened to at least one of these sections, in this instance, the section 22.

The free end of the heater section 22 is here shown as provided with a roller 38 of generally ovate form, rotatable about a pin or shaft 39 mounted in the arms 40 of a U-shaped bracket, the bight 41 of which is suitably brazed or otherwise fastened to the end of the heater section 22. The end of the sheath 23 of the heater section may be flared outwardly, as at 42, 43, to provide a base of greater cross-sectional outline for the bight 41 of the U-shaped bracket. The axis of the roller 38 is here shown as in the general plane of the broad sides of the heater section 22.

The conduits 27, 28 are desirably fastened to each other, and one way in which they may be so fastened is by brazing together the outside opposed adjacent walls of the conduits at longitudinally spaced spots 44.

The heating unit 17 may be mechanically connected to a junction box 45 by screwing the threaded nipple 30 into an internally threaded boss 46 on the junction box. The junction box 45 is here shown as provided with terminals 47, 48 to which the free ends of the conductors 32, 33 of the lead conductor section 26 of the heater unit are connected. The junction box 45 is also provided with a pair of bosses 49, 50 through which a pair of rubber covered lead wires 51, 52 are disposed, these lead wires being electrically connected within the junction box 45 to terminals 53, 54 electrically connected to the terminals 47, 48 for the lead conductors 32, 33 of the heater unit. The lead wires 51, 52 may be surrounded by externally threaded nipples 55, 56 which may form connectors whereby the opening between the rubber covered lead wires 51, 52 and the bosses 49, 50 may be sealed. The junction box 45 is provided with a cover 57 fastened by screws 58, a gasket 59 being interposed between the cover 57 and the junction box 45.

The junction box 45 may be supported, in any suitable way, as, for example, in a pot head 60 at the upper end of the conduit 15, and consequently the heater unit 17 is suspended in the conduit 15 by the junction box 45. In like manner another junction box 45a is disposed in and suitably supported in the pot head 60, and serves to support the heating unit 16 in a manner already described in connection with the unit 17. The heating units 20, 21 may be similarly supported in a pot head 61 at the upper end of the conduit 19, by junction boxes 45b, 45c.

Electrical connection may be made to the heating units 16, 17, 20, 21 as desired. Electrical supply conductors may be led to the pot heads 60, 61 in conduits (not shown) so that the entire heating apparatus, including its supply conductors, may be metal clad.

It will be apparent that the heating units, by reason of their construction, are effectively sealed against the entrance of liquids, vapors, fumes or gases.

In assembling, for example, the heating unit 17 with the conduit 15 the end of the heating unit 17 may be inserted through the top of the pot head 60, through the free opening of the conduit 15, and threaded progressively down into the conduit. When the end of the heating unit 17 reaches the junction between the vertical section of the conduit 15 and the first curved section, the roller 38 will engage the right hand wall of the curved junction and be rolled down the curved right hand wall, the heater section 22 of the heating unit 17 meanwhile being flexed. The inserting, or what may be termed the threading operation is continued and when the end of the heater section of the heating unit 17 continues beyond the first curved section of the conduit 15 and into the second reversely curved section, the roller 38 will be pushed against the left hand wall of the second curved section and be rolled down that wall, the heater section 22 meanwhile bending in the opposite direction. The threading process is continued until, in this instance, the end of the heating unit 17 reaches the position shown in Figure 1 in which the roller 38 does not quite engage the end wall 18 of the conduit 15. It will of course be evident that the lead conductor section 26 of the heating unit 17 also will be flexed to conform in general to the tortuosity of the conduit 15 as the threading process goes on. When the heating unit 17 has been brought to the desired position the junction box 45 may be fastened in the pot head 60, or supported in any other suitable or permissible manner, and the electrical connections to the supply line made in due course, as desired.

It will be obvious that if the width of a longer side 62 of the conduit 15 is considerable with respect to the thickness of the heating unit 17, as shown, the heating unit 17 itself need not describe as tortuous a course as the conduit 15.

The heating unit 16 may be threaded into the conduit 15 in the manner already described in connection with the heating unit 17, but in this instance the length of the heating unit 16 is such that when it is fully threaded into the conduit 15 the roller 38 at the end of the unit 16 assumes a position between the bottom of the tank 10 and the top of the tank 11.

In Figure 1 the heating unit 16 is shown as disposed to the left of the unit 17. The relative position of the heating units 16, 17 in a conduit such as the conduit 15 will depend on a number of conditions. If a narrower side 63 of the conduit is made of such width that two heating units cannot lie side by side against the wall 63 then obviously the heating units will be superimposed with reference to the wall 63. On the other hand, if the wall 63 is wide enough, the heating units may be disposed side by side alongside the wall 63. Those proportions are chosen which are best suited to the particular conditions to be met. In some instances either situation of the heating units in the conduit will be satisfactory. Furthermore, heating units may be disposed in the conduit both in laterally side-by-side, and superimposed relation, where more than two heating units are used in a conduit.

The relative lengths of the heater section and lead conductor section of any individual heating unit 16, 17, 20, 21 depends upon a number of factors, among which is the length of the part desired to be heated and its distance from the place where the heating unit may be threaded into the conduit. In the illustrated instance the junction 64 between the heating section 22 and the lead conductor section 26 of the longest heating unit, 17, is approximately between the bottom of the tank 10 and the top of the tank 11. The junction 64a between the heating section and the lead conductor section of the shorter heating unit, 16, is in this instance, at approximately the level of the widest horizontal section of the tank 10. Thus, heat will be applied to the lower right hand quadrant of the tank 10 and to the left hand half of the tank 11 by the heating units 16, 17 respectively. In like manner the heating units 20, 21 will apply heat to the lower left hand quadrant of the tank 10 and to the right hand half of the tank 11. It is of course evident that the relative proportions of the heating units and their relation to the structure to be heated and to each other will vary according to the conditions to be met.

It will be observed that the heating section 22a of the shorter heating unit, 16, overlaps the lead conductor section 26 of the longer heating unit, 17. In view, however, of the construction of the lead conductor sections, the electrical insulation of the lead conductor sections will not be impaired even though a heater section is disposed immediately adjacent thereto.

The heating units, such as 16, 17, while their heating sections are not of the same length, may be so designed that they may be supplied with the same terminal voltage, or may be so designed as to consume the same number of watts, or both. On the other hand, they may be so designed that they operate on different voltages or consume different amounts of power, or both.

It will also be apparent that the heating sections of the heating units may be disposed together in whole or part so that more heat may be applied in one place than in another. Various arrangements will readily suggest themselves to those skilled in the art.

The free end of the heater section of the heating units may be formed in any other suitable manner to facilitate threading of the heating units into a tortuous conduit, and in Figure 5 there is shown one other form of end construction for the heater section of a heating unit. The heater section may be provided with a generally spear-head shaped end, which may be either pointed or rounded, and in the case of Figure 5 is formed by bending a short portion 65 of the end of the heater section back over the heater section and shaping the resultant loop to generally avoid form. It will of course be obvious that other suitable forms of anti-friction end-constructions will readily suggest themselves in the light of the present disclosure.

If desired, to meet particular conditions, the wide sides of the heating units may be provided with a desired number of anti-friction devices, spaced longitudinally of the heating unit. One form which such anti-friction devices may assume is illustrated in Figures 2 and 3. A roller 66, having its axis in a plane parallel to the general plane of the wide sides of the heating unit and transverse to the length of the unit, is pivotally mounted between flanges 67, 68 of a bracket of generally V-shaped cross-section, the bight 69 of which is suitably fastened to the sheath 23. The bight 69 is provided with an aperture 70 to accommodate the roller 66, so that a roller of the desired size may be used without having its pivot too remote from the sheath 23. The flanges 67, 68 are tapered off, from their longitudinal centers, at the pivot of the roller 66, to their ends so as to form cam surfaces 71, 72 leading from the surface of the sheath 23 to the roller 66, the roller 66 extending laterally a desired amount beyond the crest formed at the junction of the cam surfaces 71, 72. The opposite face of the sheath 23 is desirably provided with a roller 66a pivoted in a bracket similar to that already described in connection with the roller 66.

It will be understood that rollers, such as the roller 66, may also be provided, if desired, along the lead conductor section 26 of the unit.

It will be apparent that the heating unit herein disclosed is particularly adapted for use in such structures as hydraulic dam gates, lock gates, spillways, sumps, tanks, tank cars, bent pipes, and hydraulic works of all kinds, or in general where heating of a liquid may be required. In general, the heating unit is adapted to be used for heating structures not readily accessible, or to which heat may not be readily applied, either by reason of their location or their configuration, or both. The heating unit is also particularly adapted for insertion in conduits or passages which are either in themselves tortuous or bent or have obstructions therein, or protrusions from the walls thereof, or both, making them in effect tortuous or bent.

From the foregoing it will be apparent to those skilled in the art that the illustrated embodiments of my invention provide new and improved heated structures and heating units, and accordingly, each accomplishes at least the principal object of my invention. On the other hand, it also will be obvious to those skilled in the art that the illustrated embodiments of my invention may be variously changed and modified, or features thereof, singly or collectively, embodied in other combinations than those illustrated, without departing from the spirit of my invention, or sacrificing all of the advantages thereof, and that accordingly, the disclosure herein is illustrative only, and my invention is not limited either to the particular heated structure or the particular heating unit.

I claim:

1. In combination: a structure having a portion to be heated, said structure having a passage; a plurality of elongated electrical heating units in said passage; individual armoring means for and forming a part of each of said units; and at least two of said heating units each having a heating element section and a lead conductor section, said sections being staggered with respect to each other so that a heating element section of one unit overlaps a lead conductor section of another unit.

2. An elongated armored flexible electrical heating unit, and anti-friction means, carried by and forming a part of said unit, for facilitating movement of said unit relative to an adjacent surface.

3. An elongated armored flexible electrical heating unit; said unit having a portion including an elongated flexible metallic sheath enclosing electrical heating means and refractory insulation disposed between said heating means and said sheath; said portion being so constructed and arranged that its flexibility in a plane including the longitudinal axis of said portion is materially greater than its flexibility in a plane, including said axis, at an angle to said first named plane.

4. An elongated armored flexible electrical heating unit having a free end, said free end being constructed and arranged for facilitating movement of said end relative to an adjacent surface.

5. An elongated armored flexible electrical heating unit having a free end, said free end being so constructed and arranged as to reduce friction between said end and an adjacent surface to facilitate movement of said end relative to the surface.

6. An elongated armored flexible electrical heating unit having a free end, said free end being so constructed and arranged as to ride over irregularities on a surface to facilitate movement of said end relative to the surface.

7. An elongated armored flexible electrical heating unit, comprising: a heating element section; an elongated lead conductor section; and said lead conductor section including a plurality of unitary metallic flexible conduits each conduit containing at least one insulated lead conductor.

8. An elongated armored flexible electrical heating unit; said unit having a portion including metallic flexible armoring means, and a resistor embedded in compacted refractory insulating material in said armoring means; and said portion being so constructed and arranged that it may be flexed in a plane including the longitudinal axis of said portion, in either of two opposite directions, to a minimum radius of curvature the same in either direction.

9. An elongated armored flexible electrical heating unit, comprising: an armored heater section; an armored lead conductor section; said heater section including a resistor provided with metallic flexible armoring means; said lead conductor section including a lead conductor provided with metallic flexible armoring means; and means for uniting adjacent ends of the armoring means of said sections.

10. An elongated armored flexible electrical heating unit, comprising: an armored heater section; an armored lead conductor section; said heater section including a resistor provided with metallic flexible armoring means; said lead conductor section including a lead conductor provided with metallic flexible armoring means; and said armored sections being so constructed and arranged that the flexibility of said lead conductor section is materially different from the flexibility of said heater section.

11. An elongated armored flexible electrical heating unit, comprising: a heating element section including a resistor; a lead conductor section including a metallic flexible conduit; a lead conductor of relatively low resistance compared to said resistor disposed in said conduit; and refractory insulating means interposed between said lead conductor and the inside wall of said conduit, said refractory insulating means being so constructed and arranged that it is flexible in conformity with the flexing of said conduit.

12. An elongated armored flexible electrical heating unit having a free end, said free end being provided with an enlarged portion having a convex surface so constructed and arranged that movement of said end relative to an adjacent surface is facilitated.

13. An elongated armored flexible electrical heating unit having a free end, said free end being bent into the form of a loop constructed and arranged to facilitate movement of said end relative to an adjacent surface.

14. An elongated armored flexible electrical heating unit, and means, including at least one roller rotatably mounted on said unit, constructed and arranged to facilitate movement of said unit relative to an adjacent surface.

15. An elongated armored flexible electrical heating unit having an oblong cross-sectional outline, and means, including at least one roller rotatably mounted on said unit with its axis substantially parallel to the longer axis of said oblong cross-sectional outline, constructed and arranged to facilitate movement of said unit relative to an adjacent surface.

16. An elongated armored flexible electrical heating unit; said unit having a portion including metallic flexible armoring means, and a resistor embedded in compacted refractory insulating material in said armoring means; and said portion having an oblong cross-sectional outline and being so constructed and arranged that it may be flexed in a plane, including the longitudinal axis of said portion, transverse to the longer axis of said cross-sectional outline, in either of two opposite directions, to a minimum radius of curvature the same in either direction.

17. An elongated armored flexible electrical heating unit, comprising: an armored heater section; an armored lead conductor section; said heater section including a resistor embedded in compacted refractory insulation provided with metallic flexible armoring means; said lead conductor section including a metallic flexible conduit; a lead conductor, of relatively low resistance compared to said resistor, disposed in said conduit; and refractory insulating beads disposed within said conduit and threaded slidably on said lead conductor.

18. An elongated armored flexible electrical heating unit, comprising: a heating element section; an elongated lead conductor section; said lead conductor section including a plurality of unitary metallic flexible conduits each conduit containing at least one insulated lead conductor, said conduits being disposed adjacent each other; and means fastening adjacent conduits to each other at least at a plurality of longitudinally spaced points.

19. An elongated armored flexible electrical heating unit, comprising: an armored heater section; an armored lead conductor section; said heater section including a resistor provided with metallic flexible armoring means having an oblong cross-sectional outline; said lead conductor section including a plurality of unitary metallic flexible conduits each conduit serving as armoring means for at least one insulated conductor contained therein; said conduits having the ends thereof, adjacent an end of said heater section, disposed in the general plane of the longer axis of said oblong cross-sectional outline; and means uniting said adjacent ends of the armoring means of said sections.

20. An elongated armored flexible electrical heating unit, comprising: an armored heater section; an armored lead conductor section; said heater section including a resistor embedded in compacted refractory insulation provided with metallic flexible armoring means having an oblong cross-sectional outline, and being so constructed and arranged that the flexibility of said heater section in a plane including the longitudinal axis thereof and substantially at right angles to the longer axis of said oblong cross-sectional outline is materially greater than its flexibility in a plane, including said longitudinal axis, at an angle to said first named plane; said lead conductor section including a plurality of unitary metallic flexible conduits each conduit serving as armoring means for at least one insulated conductor contained therein; said conduits having the ends thereof, adjacent an end of said heater section, disposed in the general plane of the longer axis of said oblong cross-sectional outline; and means uniting said adjacent ends of the armoring means of said sections.

21. An elongated armored flexible electrical heating unit, comprising: an armored heater section; an armored lead conductor section; said heater section including a resistor embedded in compacted refractory insulation provided with metallic flexible armoring means having an oblong cross-sectional outline, and being so constructed and arranged that the flexibility of said heater section in a plane including the longitudinal axis thereof and substantially at right angles to the longer axis of said oblong cross-sectional outline is materially greater than its flexibility in a plane including said longitudinal axis and disposed at an angle to said first named plane; said lead conductor section including a plurality of unitary metallic flexible conduits each conduit serving as armoring means for at least one conductor contained therein and insulated therefrom by refractory insulating beads threaded slidably on said lead conductor; said conduits having the ends thereof, adjacent an end of said heater section, disposed in the general plane of the longer axis of said oblong cross-sectional outline; and means uniting said adjacent ends of the armoring means of said sections.

EDWIN L. WIEGAND.